United States Patent [19]
Arlott et al.

[11] Patent Number: 4,810,105
[45] Date of Patent: Mar. 7, 1989

[54] BEARING SLEEVES

[75] Inventors: Colin Arlott, Tewkesbury, England; Manmohan S. Kalsi, Sugarland, Tex.

[73] Assignee: NL Sperry-Sun, Inc., Houston, Tex.

[21] Appl. No.: 26,949

[22] Filed: Mar. 17, 1987

[30] Foreign Application Priority Data

Mar. 18, 1986 [GB] United Kingdom ............ 8606638

[51] Int. Cl.$^4$ .................... F16C 3/00; F16C 17/10; F16C 33/10
[52] U.S. Cl. .................... 384/97; 384/107; 384/275; 384/291; 384/368
[58] Field of Search ........... 384/97, 98, 107, 112, 384/114, 121, 123, 124, 125, 362, 368, 470, 904, 129, 223, 243, 275, 276, 295–297, 220–223, 291

[56] References Cited

U.S. PATENT DOCUMENTS

| | | | |
|---|---|---|---|
| 1,020,552 | 3/1912 | Henry, Jr. | 384/275 |
| 2,272,128 | 2/1942 | Osbourne | 384/291 X |
| 2,941,850 | 6/1960 | Warner | 384/307 X |
| 3,130,991 | 4/1964 | Piragino | 384/125 X |
| 3,298,762 | 1/1967 | Peck et al. | 384/125 |
| 3,455,613 | 7/1969 | McGrath | 384/97 |
| 3,499,183 | 3/1970 | Parsons | 384/276 X |
| 3,610,713 | 10/1971 | Glenn et al. | 384/305 X |
| 3,918,773 | 11/1975 | Tuffias | 384/100 X |
| 3,993,371 | 11/1976 | Orndorff, Jr. | 384/297 X |
| 4,380,355 | 4/1983 | Beardmore | 384/123 |

FOREIGN PATENT DOCUMENTS

| 1400967 | 11/1968 | Fed. Rep. of Germany | 384/291 |
| 203222 | 11/1983 | Japan | 384/322 |
| 499419 | 1/1976 | U.S.S.R. | 384/121 |

Primary Examiner—Thomas R. Hannon
Attorney, Agent, or Firm—Browning, Bushman, Zamecki & Anderson

[57] ABSTRACT

In order to support a mud-driven impeller of a downhole turbogenerator in such a manner as to provide long bearing service life in the hostile conditions down-hole, a bearing sleeve is provided which comprises an outer shell of marine brass and an inner lining of nitrile rubber bonded to the inside surface of the shell. The lining extends axially beyond the end of the shell to form a portion positioned beyond the end of the shell and turned over the end of the shell. This portion comprises radical lands separated by radial grooves, and the radial lands define axial bearing surfaces for cooperating with an axial bearing surface of a bearing member which the bearing sleeve surrounds in use.

8 Claims, 4 Drawing Sheets

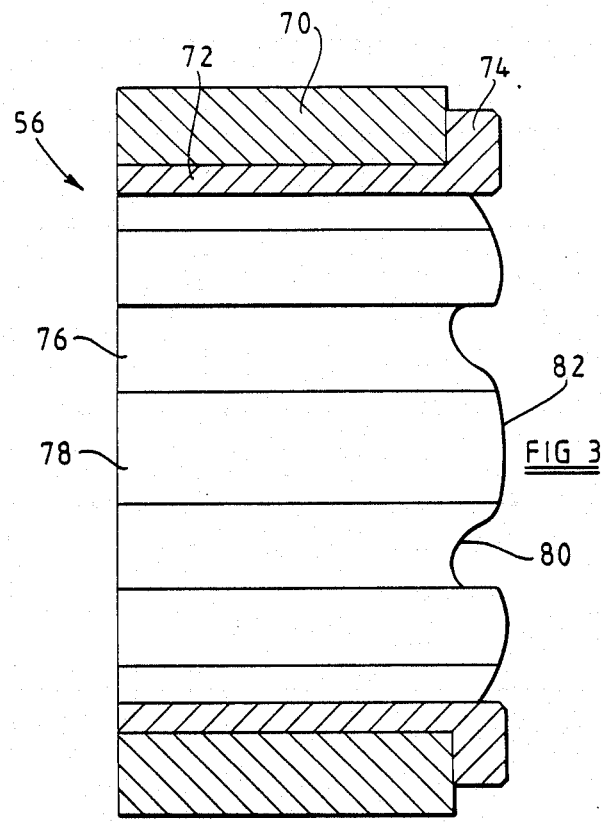
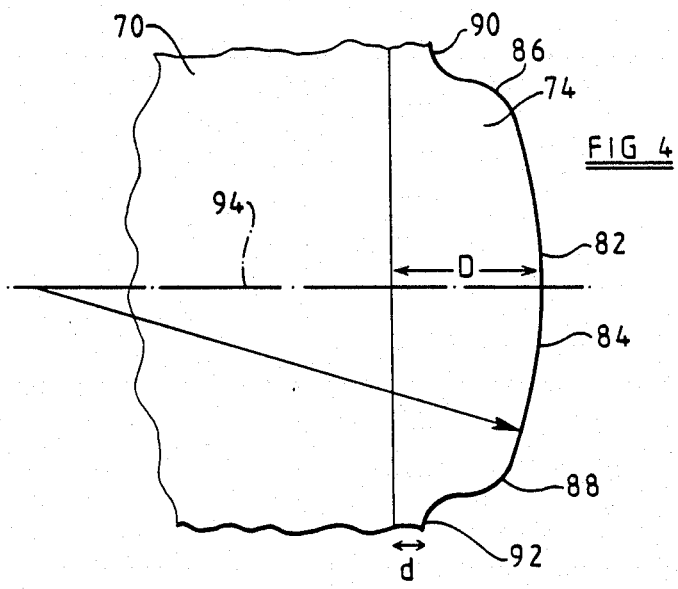

BEARING SLEEVES

This invention relates to bearing sleeves for supporting rotary annular members or rotary shafts.

In the field of drilling, there are many circumstances in which it is desirable for electrical power to be generated down-hole by a turbogenerator driven by the drilling mud flow or for mechanical energy required for a moving part down-hole to be generated directly by an impeller driven by the mud flow. The applicant's British Patent Specifications Nos. 2,082,653A and 2,087,951A disclose arrangements in which a mud-driven annular impeller surrounds an elongate casing and drives an electrical generator within the casing, as well as a throttling member for generating pressure pulses in the mud flow with the object of transmitting measurement data to the surface. Furthermore, in accordance with the Applicants' British Patent Application No. 8523453, a bladed stator is arranged immediately upstream of the impeller so as to act on the mud flow before it reaches the impeller, the blades of the stator being canted to cause the mud flow to impact on the blades of the impeller at such an angle that only a small thrust results at the impeller bearings.

It is an object of the invention to provide a bearing sleeve which is capable of supporting the impeller in such an arrangement and which is capable of a long service life in the hostile conditions of the mud flow.

According to the invention there is provided a bearing sleeve comprising a relatively rigid annular shell and a lining of elastomeric material on the inside wall of the shell, the lining extending axially beyond one or each end of the shell to form an axial thrust bearing surface positioned beyond said one or each end of the shell.

The invention also provides a bearing sleeve having, at one or each end of the sleeve, a plurality of equiangularly spaced lands forming axial thrust bearing surfaces separated by radially extending grooves, wherein each bearing surface has an inlet and an outlet side considered in relation to the direction from which circumferentially flowing lubricating fluid passes over the bearing surface in use, and the bearing surface is narrower at its inlet side than at its outlet side.

In order that the invention may be more fully understood, preferred embodiments of the invention will now be described, by way of example, with reference to the accompanying drawings, in which:

FIG. 3 is an axial section taken along the line III—III in FIG. 2;

FIG. 4 is a detail of FIG. 3 showing the crown profile;

Figure 1:
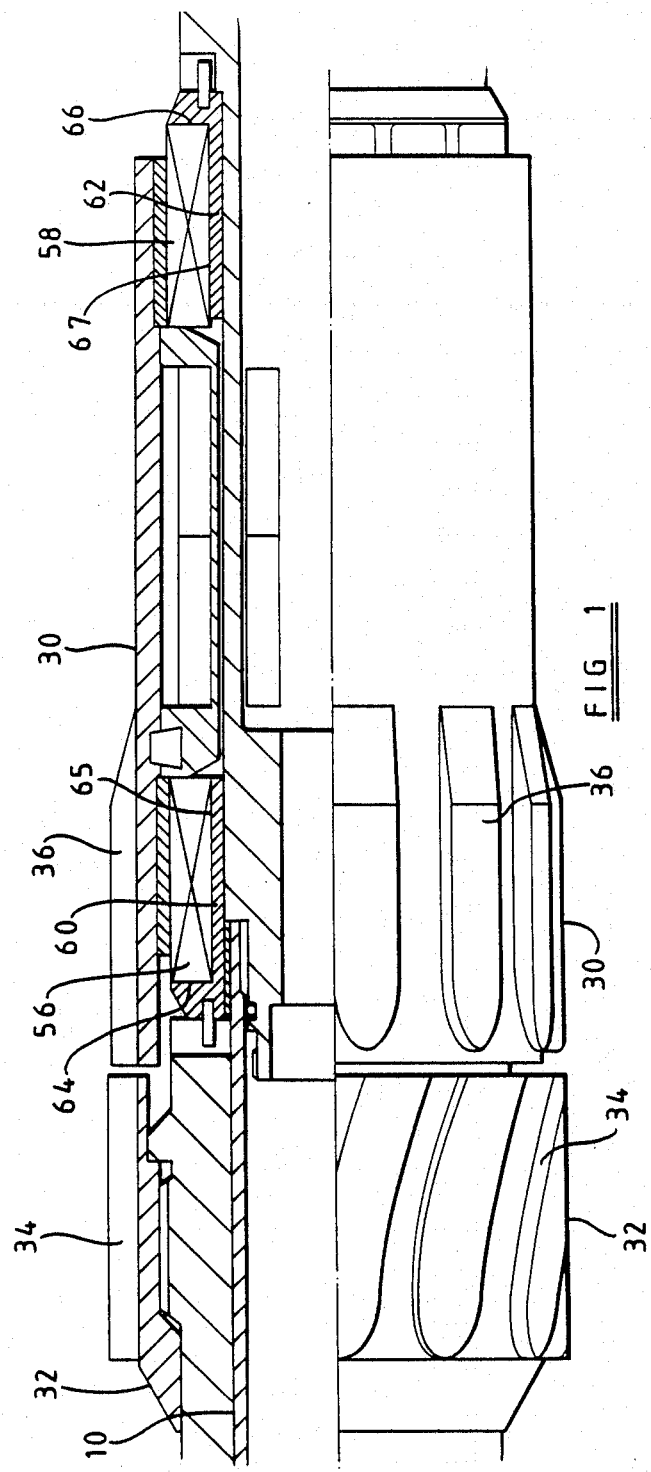
FIG. 1 is a side view of part of a down-hole signal transmitter making use of two such bearings, the upper part of the figure being shown in axial section.

Before describing the sleeve bearing in detail, a brief description will be given with reference to FIG. 1 of a signal transmitter incorporating two such bearings, in order that the intended function of the bearing can be appreciated. The signal transmitter, which is intended to be installed within a drill collar disposed at the end of a drill string within a borehole during drilling, serves to transmit measurement data to the surface, in the form of pressure pulses, by modulating the pressure of the mud which passes down the drill string. The transmitter includes, within a casing 10, a throttling member which is displaceable axially relative to a throttle orifice to vary the throughflow cross-section of the orifice and thereby produce pressure pulses in the mud flow passing through this orifice. An annular impeller 30 surrounds the casing 10 and is rotatable in the mud flow. The impeller 30 is magnetically coupled to a drive member within the casing 10 so as to drive the drive member which in turn drives both a pump and an electrical generator for supplying electrical power downhole. The pump is provided to linearly displace the throttling member, the direction of displacement being determined by a solenoid actuator under control of an electrical input signal. It will be appreciated that a number of the components referred to above are not visible in FIG. 1. However, the detailed structure and operation of such a signal transmitter may be determined by reference to the applicants' British Patent Specification No. 2,123,458A.

An annular stator 32 also surrounds the casing 10 upstream of the impeller 30 and is fixed to the casing 10. The stator 32 has blades 34 canted in one sense relative to the mud flow direction, whereas the impeller 30 has blades 36 parallel to the mud flow direction. The impeller 30 is rotatably mounted with respect to the casing 10 by means of upper and lower sleeve bearings 56 and 58. Each bearing 56 or 58 surrounds an annular bearing member 60 or 62 defining axial and radial bearing surfaces 64, 65 or 66, 67. The bearings 56 and 58 are fixed to the impeller 30, and the bearing members 60 and 62 are fixed to the casing 10. Furthermore the bearings 56 and 58 are lubricated by the mud flow and are so formed as to take up both axial and radial thrust in a manner which will be described in more detail below.

Figure 2:
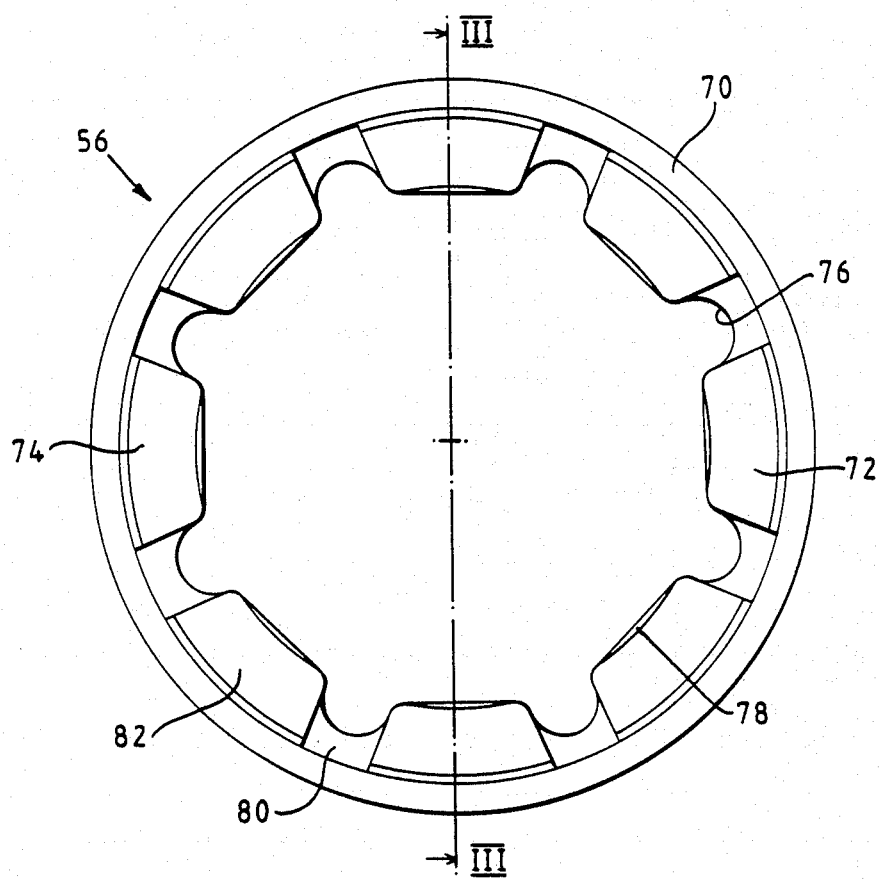
FIG. 2 is a view of the bearing from one end.

Referring to FIGS. 2 and 3, the bearing 56 or 58 comprises an outer shell 70 of marine brass and an inner lining 72 bonded to the inside surface of the shell 70 and made of nitrile rubber of hardness 65–80 Shore A. As will be apparent more particularly from FIG. 3, the inner lining 72 extends axially beyond one end of the shell 70 so as to form an annular portion 74 positioned beyond the end of the shell 70 and turned over the end of the shell 70. Furthermore the lining 72 is formed with eight equiangularly spaced axial grooves 76 which allow the flow of lubricating mud from one end of the bearing to the other. Eight equiangularly spaced axial lands 78 are formed intermediate these grooves and serve as radial bearing surfaces for bearing against the radial bearing surface 65 or 67 of the annular bearing member 60 or 62 positioned within the bearing 56 or 58 in the arrangement of FIG. 1.

In addition eight equiangularly spaced radial recesses 80 are formed in the axial bearing portion 74 positioned beyond one end of the shell 70, the radial positioning of these recesses 80 corresponding to the radial positioning of the axial grooves 76. Eight equiangularly spaced radial lands 82 are disposed intermediate the radial recesses 80, in radial positions corresponding to the radial positions of the axial lands 78, and define axial bearing surfaces for cooperating with the axial bearing surface 64 or 66 of the bearing member 60 or 62 positioned within the bearing 56 or 58 in the arrangement of FIG. 1.

In order to optimise the bearing properties of the axial bearing surfaces of the bearing 56 or 58 rotating with respect to the bearing member 60 or 62, it is of importance that the radial lands 82 should have a critical profile which is best seen in FIG. 4. This profile is designed to produce a preferred contact pressure distribution which enables the bearing to support a load typically an order of magnitude greater than would be achievable with a profile matching the mating bearing surface of the associated bearing member 60 or 62, that is a flat surface in the case of an axial bearing surface. Such a profile additionally ensures that wear of the surface of the land 82 does not unduly affect bearing performance. It exhibits a greater wear tolerance than a similar bearing of conventional (geometrically matching) profile for which the performance depends upon maintaining the corner radius on the inlet side of the profile as viewed in the direction of rotation.

As will be seen from FIG. 4, the preferred profile comprises a central outwardly curved portion 84 of relatively large radius of curvature merging circumferentially at its two ends into outwardly curved portions 86 and 88 of relatively small radius of curvature which in turn merge into inwardly curved portions 90 and 92, also of a relatively small radius of curvature. For optimum performance, each portion of profile is not necessarily in the form of a precisely circular arc, and the profile as a whole is not necessarily exactly symmetric with respect to the axis 94. In the case where the sleeve bearing has an outside diameter of about 65 mm, an inside diameter of about 45 mm and an overall axial length of about 35 mm, the portion 84 may have a radius of curvature of 22.2 mm, the portions 86 and 88 may have a radius of curvature of 2.4 mm and the portions 90 and 92 may have a radius of curvature of 3.0 mm. In the profile of FIG. 4 the distances D and d with respect to the end of the shell 70 are about 4.7 mm and 1.0 mm respectively.

The design of the profile is chosen so as to maximise the average pressure of the contact area for a given maximum pressure and to minimise the pressure gradient on the inlet side of the bearing surface as viewed in the direction of rotation.

In the general case, the portion 84 preferably has a radius of curvature in the range from 0.5 to 1.5 times the mean radius of the sleeve (that is the average of the inside and outside radii of the sleeve) and most preferably has a radius approximately equal to the mean radius of the sleeve. Furthermore the portions 86 and 88 preferably have a radius of curvature in the range from 0.1 to 0.5, and most preferably in the range from 0.2 to 0.3, of the sleeve mean radius, and the distance D (the so-called pad thickness) is preferably in the range from 0.05 to 0.4, and most preferably in the range from 0.1 to 0.25, of the sleeve mean radius.

In a modification of the above-described bearing, the inside surface of the shell 70 is also provided with axial grooves corresponding in position to the axial grooves 76 in the lining 72, in order to improve bonding between the shell 70 and the lining 72. This will provide a radially interrupted annular surface at the end of the shell 70 for supporting the axial bearing portion 74. Alternatively a flange may be formed at the end of the shell 70 extending radially inwardly to support the axial bearing portion 74.

Figure 5A:
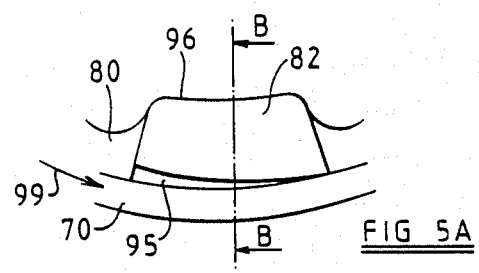
FIGS. 5A and 5B show respectively views from one end and along the line B—B in FIG. 5A of a bearing land of a modified embodiment.
Figure 5B:
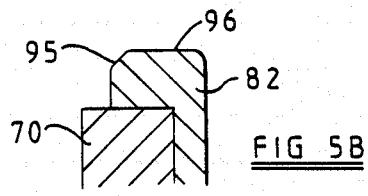

In a further modification, the outer corner of each radial land 82 is chamferred in a manner shown at 95 in FIGS. 5A and 5B so as to render the bearing surface 96 of the land 82 more narrow at its inlet side than at its outlet side as considered in relation to the direction 99 from which lubricating mud flows between the bearing surface 96 and the bearing surface of the associated bearing member 60 or 62. This creates fluid wedging and provides positive hydrodynamic action at the outer periphery of the bearing so as to combat side leakage of lubricating mud and centrifugal losses outwardly of the sleeve. It will be appreciated that the degree of chamfer will decrease from the inlet side to the outlet side, and that FIG. 5B shows the mean degree of chamfer.

Figure 6A:
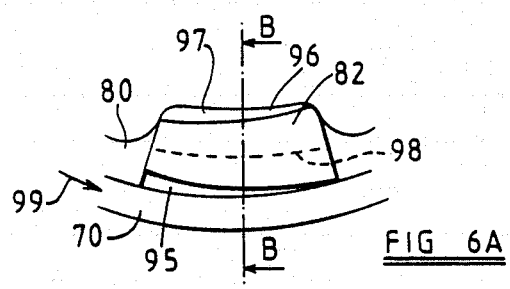
FIGS. 6A and 6B show respectively views from one end and along the line B—B in FIG. 6A of a bearing land of a further modified embodiment.
Figure 6B:
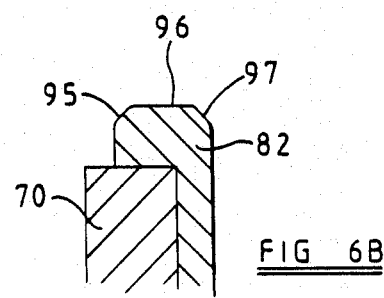

In another modification, both the outer corner and the inner corner of each radial land 82 are chamferred as shown at 95 and 97 in FIGS. 6A and 6B. A similar effect is achieved as with the arrangement of FIGS. 5A and 5B except that, in this case, hydrodynamic action is also provided at the inner periphery of the bearing so as to combat side leakage inwardly of the sleeve. In each case the effect of the chamferring will be to increase the film thickness of the lubricating mud between the bearing surface 96 and the bearing surface of the associated bearing member 60 or 62 so as to provide more efficient lubrication of the bearing. The bearing surface 96 as shown in FIG. 6A may be considered to have the form of a trapezium which has been distorted so that its centre line lies along a curve 98 and its inclined sides form respectively the inner and outer peripheries of the bearing surface 96. The sides of the trapezium are preferably inclined at an angle in the range from 3° to 15°, and most preferably of about 5°, to the centre line of the trapezium.

Although the above-described bearings are described in arrangements in which the bearing sleeve is rotatable on a stationary support, it should be appreciated that such bearings could also be used in arrangements in which the bearing sleeve is stationary and a rotatable shaft extends through the sleeve. Furthermore, although the bearings described are impeller bearings, similar bearings could be used in down-hole motors.

We claim:

1. A drilling-mud-lubricated rotary bearing sleeve comprising a relatively rigid annular shell having an inside wall and a lining of elastomeric material on the inside wall of the shell defining inner bearing lands for taking up radial thrust forces from the outer cylindrical surface of a part with which the sleeve is in rotational engagement in use, the inner bearing lands being separated by grooves extending generally longitudinally of the sleeve and provided for passage of drilling mud for lubricating areas of contact between the inner bearing lands and the outer cylindrical surface, the lining extending axially beyond one or each end of the sleeve to form radial bearing lands positioned beyond said one or each end of the shell for taking up axial thrust forces from a shoulder portion of the part with which the sleeve is in rotational engagement in use, the radial bearing lands being separated by grooves extending generally radially of the sleeve and provided for passage of drilling mud for lubricating areas of contact between the radial bearing lands and the shoulder portion, wherein each of the radial bearing lands has a crown which is convexly curved in the circumferential direction so as to provide tolerance to wear by particles within the drilling mud.

2. A bearing sleeve according to claim 1, wherein the portion of the lining which extends beyond said one or each end of the shell is turned over the end of the shell so as to be supported by the end of the shell.

3. A bearing sleeve according to claim 2, wherein the sleeve has a mean radius and said portion of the lining extends beyond said one or each end of the shell by a distance in the range from 0.05 to 0.4 of the means radius of the sleeve.

4. A bearing sleeve according to claim 1, wherein the sleeve has a mean radius and the convexly curved crown of each radial bearing land has a radius of curvature in the range from 0.5 to 1.5 times the mean radius of the sleeve.

5. A bearing sleeve according to claim 1 or 4 wherein the crown of each radial bearing land has a profile in the circumferential direction comprising a central, convexly curved portion having a relatively large radius of curvature and forming an axial thrust bearing surface, and a respective further convexly curved portion having a relatively small radius of curvature at each end of the central portion.

6. A bearing sleeve according to claim 5, wherein sleeve has a mean radius and each further convexly curved portion has a radius of curvature in the range from 0.1 to 0.5 of the mean radius of the sleeve.

7. A bearing sleeve according to claim 1, wherein the lining is made of nitrile or carboxylated nitrile or epichlorohydrin rubber with a hardness in the range of 60 to 80 Shore A.

8. A drilling-mud-lubricated rotary bearing sleeve having, at one or each end of the sleeve, a plurality of equiangularly spaced radial bearing lands for taking up axial thrust forces from a shoulder portion of a part with which the sleeve is in rotational engagement in use, the radial bearing lands being separated by grooves extending generally radially of the sleeve and provided for passage of drilling mud for lubricating areas of contact between the radial bearing lands and the shoulder portion, wherein each of the radial bearing lands has an inlet side and an outlet side considered in relation to the direction from which circumferentially flowing lubricating drilling mud passes over the crown of the radial bearing land during relative rotation of the sleeve and the part with which the sleeve is in engagement in use, and wherein each radial bearing land is narrower at its inlet side than at its outlet side so as to provide positive hydrodynamic action at the outer periphery of the sleeve combatting leakage of drilling mud outwardly of the sleeve during relative rotation of the sleeve and the part with which the sleeve is in engagement.

* * * * *